US007606832B2

(12) United States Patent
Chafle et al.

(10) Patent No.: US 7,606,832 B2
(45) Date of Patent: Oct. 20, 2009

(54) SYSTEM AND METHOD FOR ORCHESTRATING COMPOSITE WEB SERVICES IN CONSTRAINED DATA FLOW ENVIRONMENTS

(75) Inventors: Girish B. Chafle, New Delhi (IN); Sunil Chandra, New Delhi (IN); Sugata Ghosal, New Delhi (IN); Vijay Mann, Haryana (IN); Mangala G. Nanda, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 10/987,997

(22) Filed: Nov. 12, 2004

(65) Prior Publication Data
US 2006/0106748 A1    May 18, 2006

(51) Int. Cl.
*G06F 17/00* (2006.01)
(52) U.S. Cl. .................... 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

| | | | |
|---|---|---|---|
| 2002/0078046 A1 | 6/2002 | Uluakar et al. | |
| 2003/0055868 A1 | 3/2003 | Fletcher et al. | |
| 2003/0097464 A1 | 5/2003 | Martinez et al. | |
| 2003/0187946 A1* | 10/2003 | Cable | 709/215 |
| 2004/0064529 A1 | 4/2004 | Meredith et al. | |

FOREIGN PATENT DOCUMENTS

CA    2 376 038    9/2003

OTHER PUBLICATIONS

Papazoglou, et al., "Leveraging Web-Services and Peer-To-Peer Networks", CAiSE 2003, LNCS 2681, pp. 485-501, 2003.
Mike P. Papazoglou, "Service-Oriented Computing: Concepts, Characteristics and Directions", 10 pages total, 2001.
Mennie, et al., "A Runtime Composite Service Creation and Deployment Infrastructure and its Applications in Internet Security, E-Commerce, and Software Provisioning", 6 pages total, 2001.
Curbera, et al., "The Next Step in Web Services", Communications of the ACM, Oct. 2003, vol. 46, No. 10, pp. 29-34.

(Continued)

*Primary Examiner*—Isaac M Woo
(74) *Attorney, Agent, or Firm*—Gibb I.P. Law Firm, LLC

(57) ABSTRACT

A technique for orchestrating composite web services in a constrained data flow environment. Data flow constraints represent the restrictions which the domains involved in composition might want to impose on access to the data they provide or the source from which they can accept data. The data flow constraints are overcome by breaking down an input composite web service specification into topologies (a topology is a set of partitions communicatively connected with one another at runtime). The system applies a rule-based filtering mechanism to choose a topology that does not violate any data flow constraints. Each of the partitions belonging to the chosen topology is executed within the same domain as the corresponding web service it invokes, thus having the same access rights as the corresponding web service. The composite web service is orchestrated in a decentralized fashion using these partitions, thereby ensuring that no data flow constraints are violated.

21 Claims, 8 Drawing Sheets

OTHER PUBLICATIONS

Browne, et al., "Goal-Focused Self-Modifying Workflow in the Healthcare Domain", IEEE, Proceedings of the 37th Hawaii International Conference on System Science, 2004, pp. 1-10.

Zeng, et al., "Flexible Composition of Enterprise Web Services", pp. 1-22, 2001.

Joeris et al., "Managing Evolving Workflow Specifications With Schema Versioning and Migration Rules", TZI Technical Report 15, 1999, pp. 1-25.

Gregor Joeris, "Dencentralized and Flexible Workflow Enactment Based on Task Coordination Agents", 22 pages total, 2000.

Nanda, et al., "Decentralizing Execution of Composite Web Services", In Proceedings of OOPSLA'04 Conference on Object Oriented Programming Systems, Languages, and Applications, 2004, 18 pages total.

\* cited by examiner

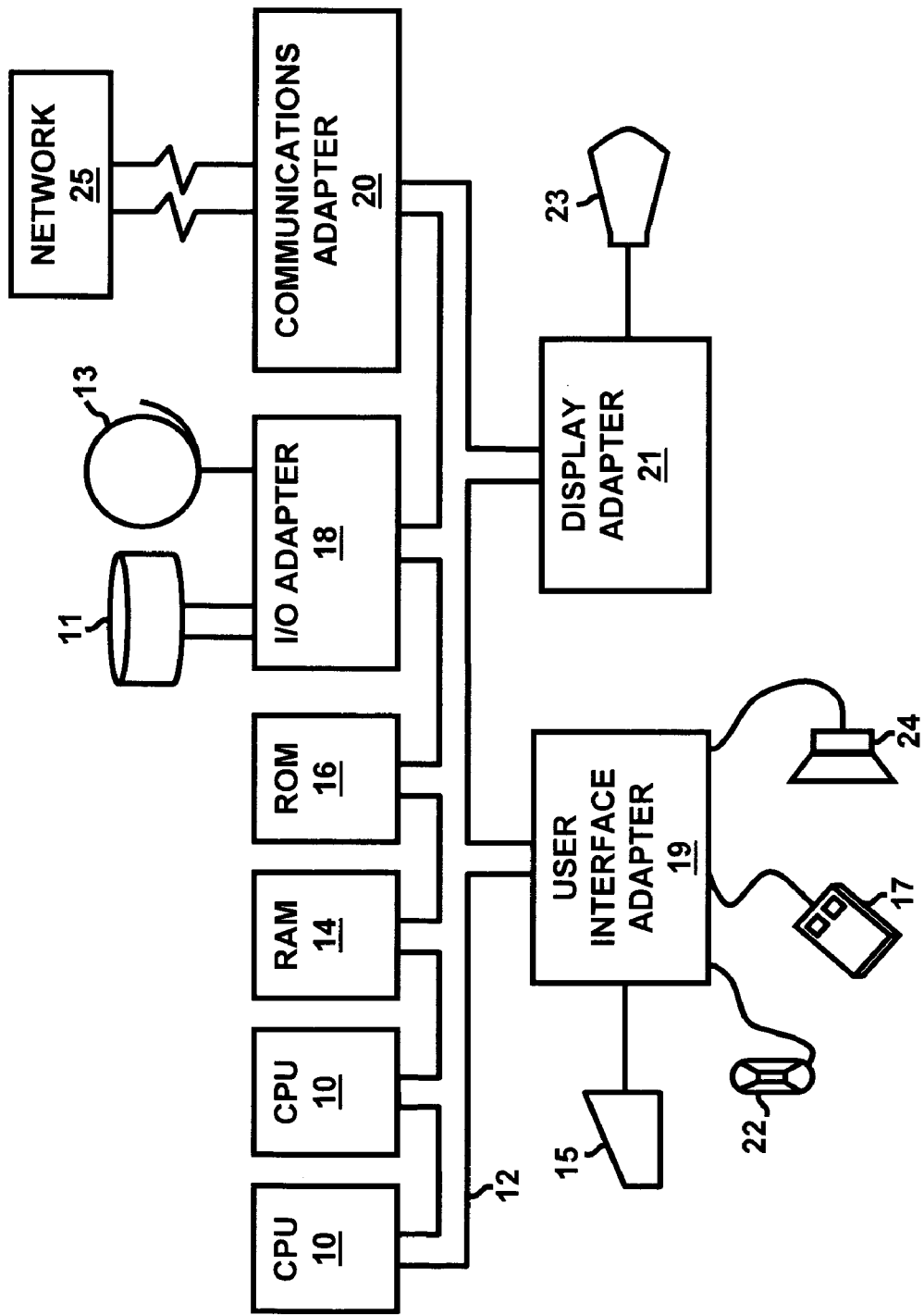

SYSTEM AND METHOD FOR ORCHESTRATING COMPOSITE WEB SERVICES IN CONSTRAINED DATA FLOW ENVIRONMENTS

BACKGROUND OF THE INVENTION

1. Field of the Invention

The embodiments of the invention generally relate to web services (WS), and more particularly to the orchestration of composite web services in constrained data flow environments.

2. Description of the Related Art

Web services are self-contained, self-describing, modular applications that can be published, located and invoked across an internet such as the World Wide Web. Web services encapsulate information, software or other resources, and make them available over a network via standard interfaces and protocols. They are based on industry standard technologies of Web Services Description Language (WSDL) (to describe), Universal Description, Discovery, and Integration (UDDI) (to advertise and syndicate), and a Simple Object Access Protocol (SOAP) (to communicate). Web services enable users to connect different components within and across organizational boundaries in a platform and language independent manner. New and complex applications can be created by aggregating the functionality provided by existing web services. This is referred to as "service composition" and the aggregated web service is known as a "composite web service". Existing web services involved in composition are known as "component web services". Web service composition enables businesses to interact with each other and process and transfer data to realize complex operations. Furthermore, new business opportunities can be realized by utilizing the existing services provided by other businesses to create a composite service.

Composite web services may be developed using a well-known specification language such as Business Process Execution Language for Web Services (BPEL4WS), Web Services Integration and Processing Language (WSIPL), Web Service Choreography Interface (WSCI), etc. and may be executed by an engine such as Websphere Business Integration Server Foundation Process Choreographer or Business Process Execution Language for Web Services Java® Run Time (BPWS4J), both available from International Business Machines, Armonk, N.Y., USA. Java® is a registered trademark of Sun Microsystems, Santa Clara, Calif., USA. Typically, a composite web service specification is executed by a single coordinator node. It receives the client requests, makes the required data transformations (modification or utilization of the output data of a component web service or input data received from the client before it is fed as input to the next component web service or sent back to the client), and invokes the component web services as per the specification. This mode of execution is referred to as "centralized orchestration". However, in certain scenarios, businesses and individuals (i.e., clients making the request) might want to impose restrictions (i.e., data constraints) on access to the data they provide or the source from which they can accept data based on their policy.

Centralized orchestration can lead to the violation of these data constraints as the central coordinator (i.e., entity facilitating the dissemination of the client's data between/among third parties) has access to the output data of all the component web services. Moreover, existing methods of data encryption and authentication generally fail here, as the centralized coordinator needs access to the output data of all the component web services for applying the necessary data transformations. These data flow constraints, thus, present obstacles for web service composition. Further, use of centralized orchestration can lead to performance (throughput, response time, scalability) degradation due to a centralized coordinator bottleneck and the occurrence of unnecessary data copying.

For example, a third party administrator such as an insurance agent 101 that provides an insurance claim service is shown in FIG. 1. In this case the customer (patient) 103 submits the request to the agent 101, which provides the hospital 105 and insurance company 107 details of the patient's request, and the agent 101 settles the claim by interacting with the web services of the hospital 105 and insurance company 107, respectively. Without any data flow constraints, agent 101 can create the composite web service using centralized orchestration. Thus, upon receiving a request from the patient 103, the agent 101 contacts the hospital web service 105, gets the medical records, passes it on to the insurance company web service 107, and receives an acknowledgement of claim settlement upon completion thereof. However, in a real world scenario, the hospital web service 105 might want to maintain confidentiality of the medical records and reveal them only to the patient 103 or to the insurance company web service 107 directly. Furthermore, the insurance company web service 107 might not want to accept medical records from any intermediary and only directly from the hospital web service 105 to ensure accuracy and authenticity of the records, for example. These data flow constraints prohibit the use of centralized orchestration to create this composite web service.

Data flow constraints are typically handled through encryption and related security mechanisms in distributed systems. There have been many efforts to compose new applications from existing components. However, most of these have been restricted to closed systems (or intra-enterprise networks) where security and data flow constraints are not of paramount concern as the composition consists of known and trusted components residing inside a trusted, perhaps internal, domain. Composition of autonomous services across the Internet to create new applications "on the fly" is a relatively new phenomenon that has been enabled by the emergence of web services. This composition raises issues in security, privacy, and authenticity of data previously ignored.

Information flow policies are used to specify confidentiality and integrity requirements and control the "end-to-end" use of data in a secure system. Secure program partitioning is a language based technique for protecting confidential data during computation in distributed systems containing mutually untrusted hosts. Confidentiality and integrity policies are expressed by annotating the programs with confidentiality labels. The program can then be partitioned automatically to run securely on heterogeneously trusted hosts. Decentralization is a relatively new technique for orchestrating composite web services, although it has been applied in earlier approaches for enabling distributed workflow execution.

Web services security is an active area of research and much effort is being directed in deriving specifications including WS-Security, WS-Policy, WS-Trust, and WS-Privacy of which only WS-Security has been specified in detail. WS-Security describes ways of attaching security tokens, signatures, and encryption headers to SOAP messages. WS-Policy describes a general-purpose model and corresponding syntax to describe and communicate the policies, capabilities, requirements, and preferences of a web service. WS-Trust describes trust models to enable web services to securely interoperate. WS-Privacy describes a model that enables web services to state their privacy preferences and organizational privacy practice statements.

The conventional specifications are generally concerned with aspects of security, privacy, and trust between the client and the web services or between two web services. Composition of third party web services requires a rich set of data transformations to be applied in between the sequential invocations of component web services. This typically cannot be accomplished in a generic way using centralized orchestration. Furthermore, security and encryption mechanisms defined in WS-Security and other related specifications can help adherence to data flow constraints using centralized orchestration only in limited scenarios. For example, in the case where the component web service is capable of encrypting only the critical data values and need not encrypt the entire body of the SOAP message, service composition can be performed using centralized orchestration if this data (in its encrypted form) can be fed as input to the next component web service without any data transformation and/or utilization.

In other situations, where the centralized coordinator node might need access to the output data of one of its component web services in order to provide a more valuable composite service by utilizing that data, or where the entire output message of a component web service is encrypted, centralized orchestration using WS-Security mechanisms generally cannot be used effectively. In the insurance agent example described above and illustrated in FIG. 1, the insurance agent 101 might need to look at the medical records to decide which insurance company (i.e., there may be multiple insurance companies from which to select) he/she should forward the records to (a dental insurance company or a general health insurance company, for example). The agent 101 cannot do this using centralized orchestration with encrypted data for the reasons described above.

Furthermore, centralized orchestration tends to lead to unnecessary traffic on the network as all data is transferred between the various components via the coordinator node instead of being transferred directly from the point of generation to the point of consumption. This generally leads to poor scalability and performance degradation at high loads. Therefore, there remains a need for orchestrating composite web services in constrained data flow environments without the use of a centralized coordinator.

SUMMARY OF THE INVENTION

In view of the foregoing, an embodiment of the invention provides a system, method, and service for orchestrating composite web services in a constrained data flow environment. These data flow constraints represent the restrictions which the parties involved in composition might want to impose on access to the data they provide or the source from which they can accept data. To overcome these data flow constraints the system breaks down an input composite web service specification (comprising specifications written in languages such as Business Process Execution Language for Web Services (BPEL4WS) and its corresponding Web Service Description Language (WSDL) descriptor and WSDL descriptors of the component web services) into multiple topologies, wherein a topology is a set of partitions that are communicatively connected with one another at runtime. The system applies a rule-based filtering mechanism to choose a topology that does not violate any data flow constraints. Each of the partitions belonging to the chosen topology is then executed within the same domain as the corresponding web service it invokes and hence, has the same access rights as the corresponding web service. The composite web service is then orchestrated in a decentralized fashion using these partitions, thereby ensuring that no data flow constraints are violated.

An embodiment of the invention provides a system for orchestrating composite web services in a constrained data flow environment, wherein the system comprises a build time module and one or many runtime modules. The build time module is adapted to receive a composite web service specification and comprises a decentralizer adapted to partition the composite web service specification into multiple topologies wherein each topology consists of a set of partitions that are communicatively connected to each other at runtime, wherein each composite web service partition comprises a functionally complete composite web service; a topology filter using a rule-based filtering mechanism adapted to select a topology for deployment; a constraint reinforcer that generates new data flow constraints to ensure that data flow constraints are applied to any new message type generated as a result of data transformations (modification or utilization of the output data of a component web service or input data received from the client before it is fed as input to the next component web service or sent back to the client) being applied to a message type that is part of an original data flow constraint; and a deployment manager adapted to send the partitions of the selected topology to runtime modules.

The decentralizer tool is further adapted to generate a WSDL and BPEL4WS specification for each composite web service partition. The system further comprises a constraint database adapted to provide rules for representing data flow constraints specified by component web service domains; and an eXtensible Markup Language (XML) based language to express the data flow constraints as rules specified in terms of a 3-tuple group of a source of the data, a destination of the data, and a message type for communicating the data.

The runtime module is adapted to verify and deploy composite web service partitions and comprises a runtime constraint reinforcer adapted to generate an additional set of constraints based on the composite web service partitions received in the runtime modules and its domain's data flow constraints. Furthermore, the runtime module includes a partition deployer adapted to verify that the composite web service partitions adhere to the data flow constraints of a receiving component web service domain and deploy the partition on composite service engine (e.g. BPWS4J).

Another embodiment of the invention provides a method of orchestrating composite web services in a constrained data flow environment, wherein the method comprises inputting a composite web service specification into a build time module; partitioning the composite web service specification into multiple topologies, wherein each topology consists of a set of partitions that are communicatively connected with each other at runtime, wherein each composite web service partition comprises a functionally complete composite web service; selecting a topology for deployment using a rule-based filtering mechanism; and deploying the partitions of the selected topology within the corresponding component web service domain.

The method further comprises generating a WSDL and BPEL4WS specification for each composite web service partition. The method further comprises of using a XML based language to express the data flow constraints as rules specified in terms of a 3-tuple group of a source of the data, a destination of the data, and a message type for communicating the data. The method also includes assuring that the data flow constraints are applied to any new message type generated as a result of data transformations being applied to a message type that is part of an original data flow constraint and sending the web service partitions to multiple runtime modules each residing at the component web service domain. Moreover, the method comprises generating an additional set of constraints based on the composite web service partitions received in the runtime modules and verifying that the composite web service partitions adhere to the data flow constraints of a receiving component web service domain.

Another aspect of the invention provides a program storage device readable by computer, tangibly embodying a program of instructions executable by the computer to perform a method of orchestrating composite web services in a constrained data flow environment, wherein the method comprises inputting a composite web service specification into a build time module; partitioning the composite web service specification into multiple topologies, wherein each topology consists of a set of composite web service partitions that are communicatively connected with each other at runtime, wherein each composite web service partition comprises a functionally complete composite web service; selecting a topology for deployment using a rule-based filtering mechanism; and deploying the partitions of the selected topology within the corresponding component web service domain.

Another aspect of the invention provides a service for orchestrating composite web services in a constrained data flow environment, the service inputting a composite web service specification into a build time module; partitioning the composite web service specification into multiple topologies, wherein each topology consists of a set of composite web service partitions that are communicatively connected with each other at runtime, wherein each composite web service partition comprises a functionally complete composite web service; selecting a topology for deployment using a rule-based filtering mechanism; and deploying the partitions of the selected topology within the corresponding component web service domain.

The embodiments of the invention orchestrate the composite web services requiring confidentiality of output data of its components and/or authenticity of input data of its components. The system provided by an embodiment of the invention receives a centralized composite service specification, which is easier to develop and more intuitive, and decentralizes it through automatic code partitioning, thereby making it easier for the developer to compose and deploy such a composite service in a decentralized manner. The system provided by an embodiment of the invention also helps in "on the fly" composition of web services where component web services are determined dynamically through web service discovery mechanisms such as UDDI and pre-existing policies prohibit interaction between them. In addition, the solution provided by the embodiments of the invention improves the performance of the system (throughput and response time) by exploiting concurrency, eliminating the coordinator bottleneck, reducing the network traffic and using asynchronous messaging.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 8 is a computer system diagram according to an embodiment of the invention.

DETAILED DESCRIPTION OF PREFERRED EMBODIMENTS OF THE INVENTION

Figure 1:
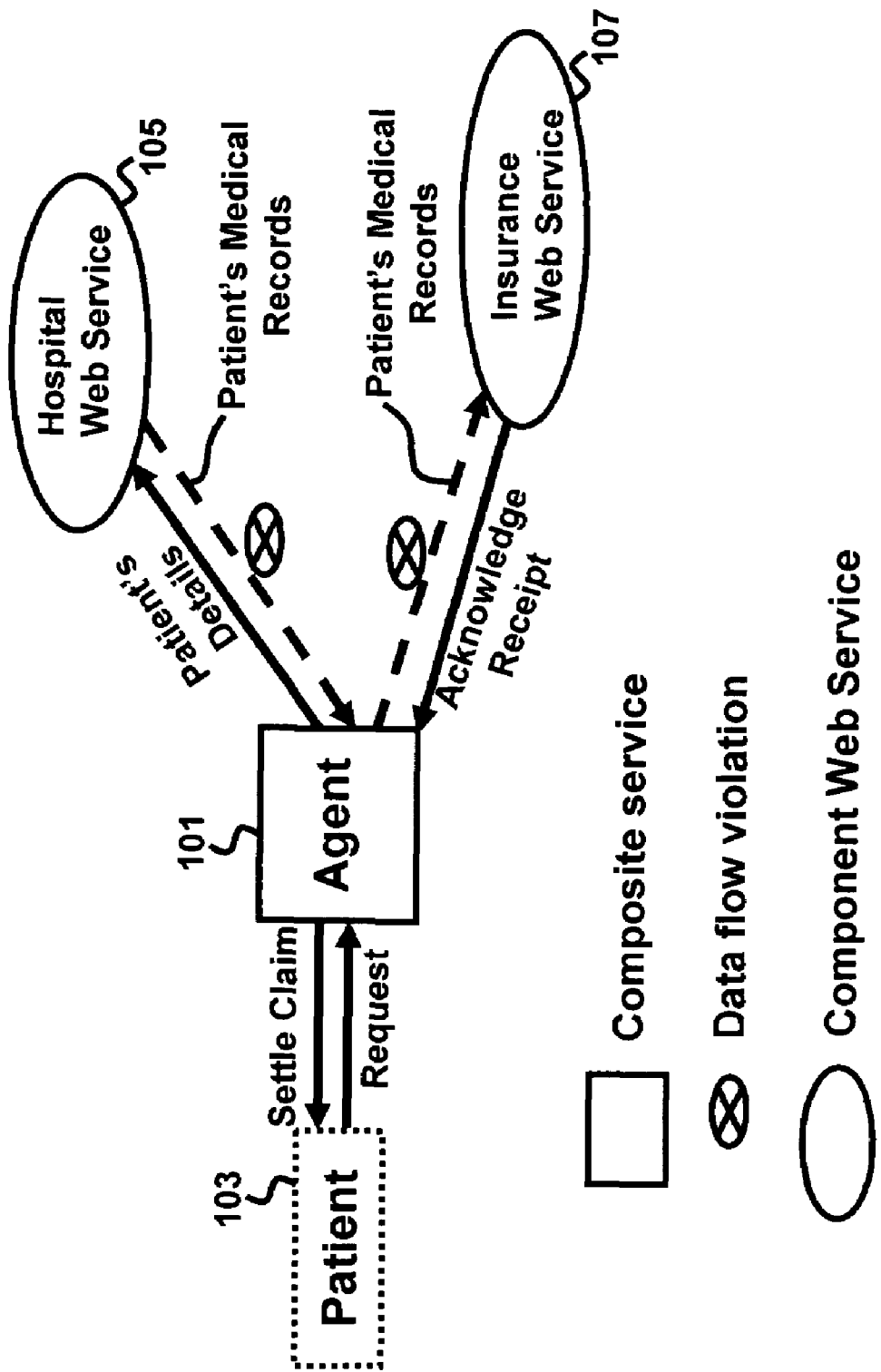
FIG. 1 is a schematic diagram of a third party administrator (insurance agent) providing an insurance claim service.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for coordinating the composition of web services in constrained data flow environments without the use of a centralized coordinator. The embodiments of the invention address this need and adhere to the rules expressing the data flow constraints by moving the data transformations (code that modifies or utilizes the output data of a component web service or input data received from the client before it is fed as input to the next component web service or sent back to the client) to be applied within a domain trusted by both the producer and the consumer of the data (which in most cases will be either the producer domain or the consumer domain). Referring now to the drawings and more particularly to FIGS. 2 through 8 where similar reference characters denote corresponding features consistently throughout the figures, there are shown preferred embodiments of the invention.

The embodiments of the invention provide a mechanism that enables the orchestration of composite web services in constrained data flow environments in a generic manner by eliminating the need for a centralized coordinator. The embodiments of the invention accomplish this by moving the data transformations (code that modifies or utilizes the output data of a component web service or input data received from the client before it is fed as input to the next component web service or sent back to the client) to be applied within a domain trusted by both the producer and the consumer of the data (which in most cases will be either the producer domain or the consumer domain) while still making use of standard languages for service composition such as BPEL4WS.

This is accomplished by partitioning the BPEL4WS specification into smaller partitions based on control and data flow analysis. These partitions are then deployed and run on nodes that are in the same domain as the nodes that provide the component web services. This is referred to as decentralized orchestration. In decentralized orchestration, there are multiple engines, each executing a composite web service specification (a portion of the original composite web service specification but complete web service in itself) at distributed locations. The engines communicate directly with each other (rather than through a central coordinator) to transfer data and control when necessary in an asynchronous manner.

Figure 2:
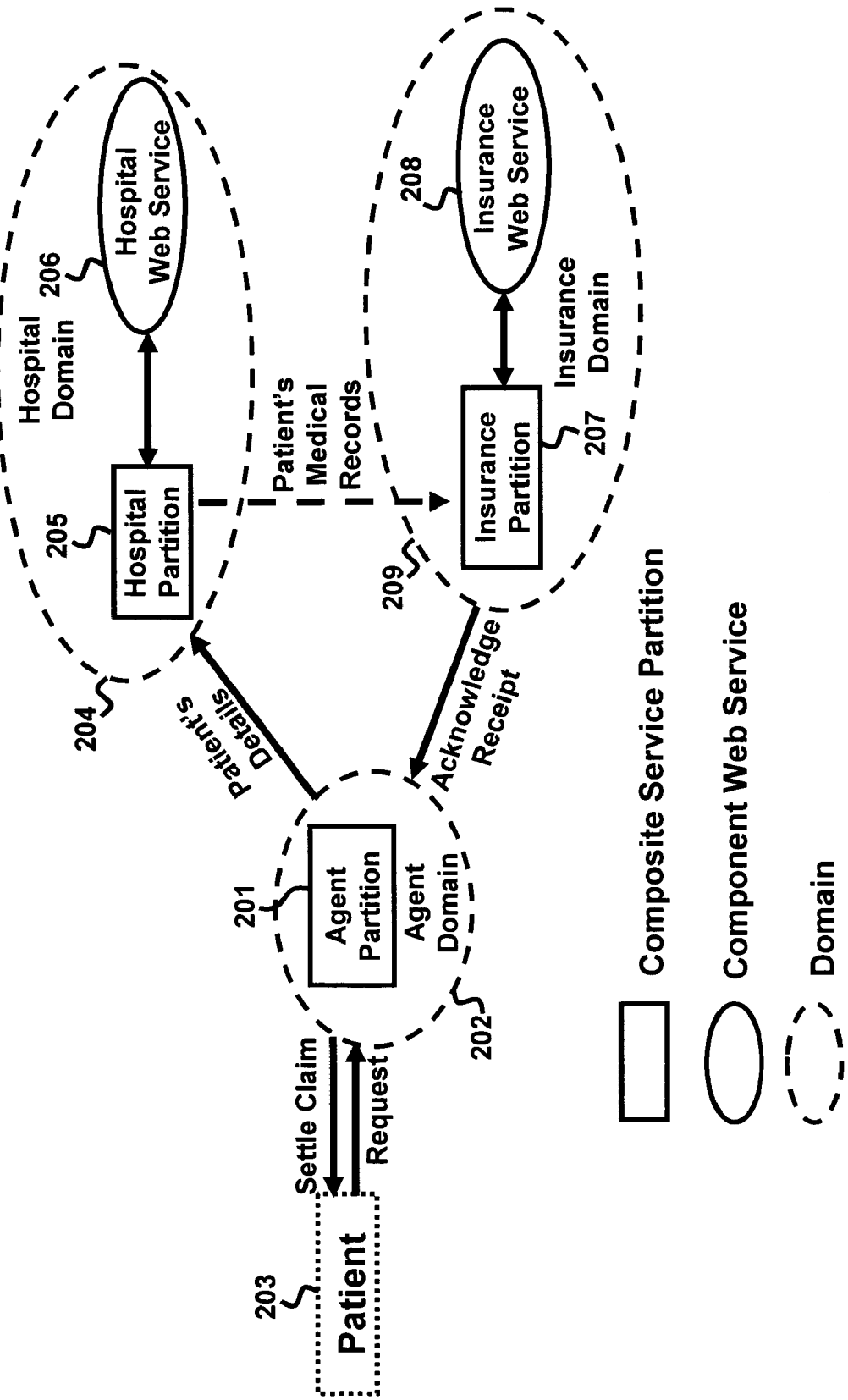
FIG. 2 is a schematic diagram of an embodiment of the invention applied to the insurance agent example of FIG. 1.

As an example, the embodiments of the invention are applied to the insurance agent example of FIG. 1, with the environment provided by the embodiments of the invention shown in FIG. 2. The component web service providers' web services' infrastructure provides the runtime environment for executing the BPEL4WS partitions (i.e. the BPEL4WS engine). Both the component web service and the BPEL4WS partition are executed inside the same domain. As shown in FIG. 2, the original BPEL4WS specification is partitioned into three partitions (agent partition 201, hospital partition 205, and insurance partition 207) taking into consideration the data flow constraints, and deployed over the web services' infrastructure of the three nodes; i.e., the node of the agent domain 202, the node of the hospital domain 204, and the node of the insurance company domain 209. On receiving a request, the agent partition 201 contacts the hospital partition 205, which retrieves the records of the patient 203 from the hospital web service 206 and directly forwards them to the insurance partition 207.

The insurance company partition 207 receives the medical records and invokes the insurance company web service 208, which after processing the claim returns an acknowledgement receipt. The insurance company partition 207 sends the acknowledgement receipt back to the agent partition 201. This data flow ensures that the medical records of the patient 203 are not exposed to the insurance agent domain 202 and are sent directly from the hospital's domain 204 to the insurance company's domain 209. The use of WS-Security mechanisms such as digital signatures at the hospital domain 204 also aid in validating the authenticity of the data for the insurance company 206. Thus, it becomes feasible for the agent to compose this service even in the presence of the data flow constraints.

Figure 3:
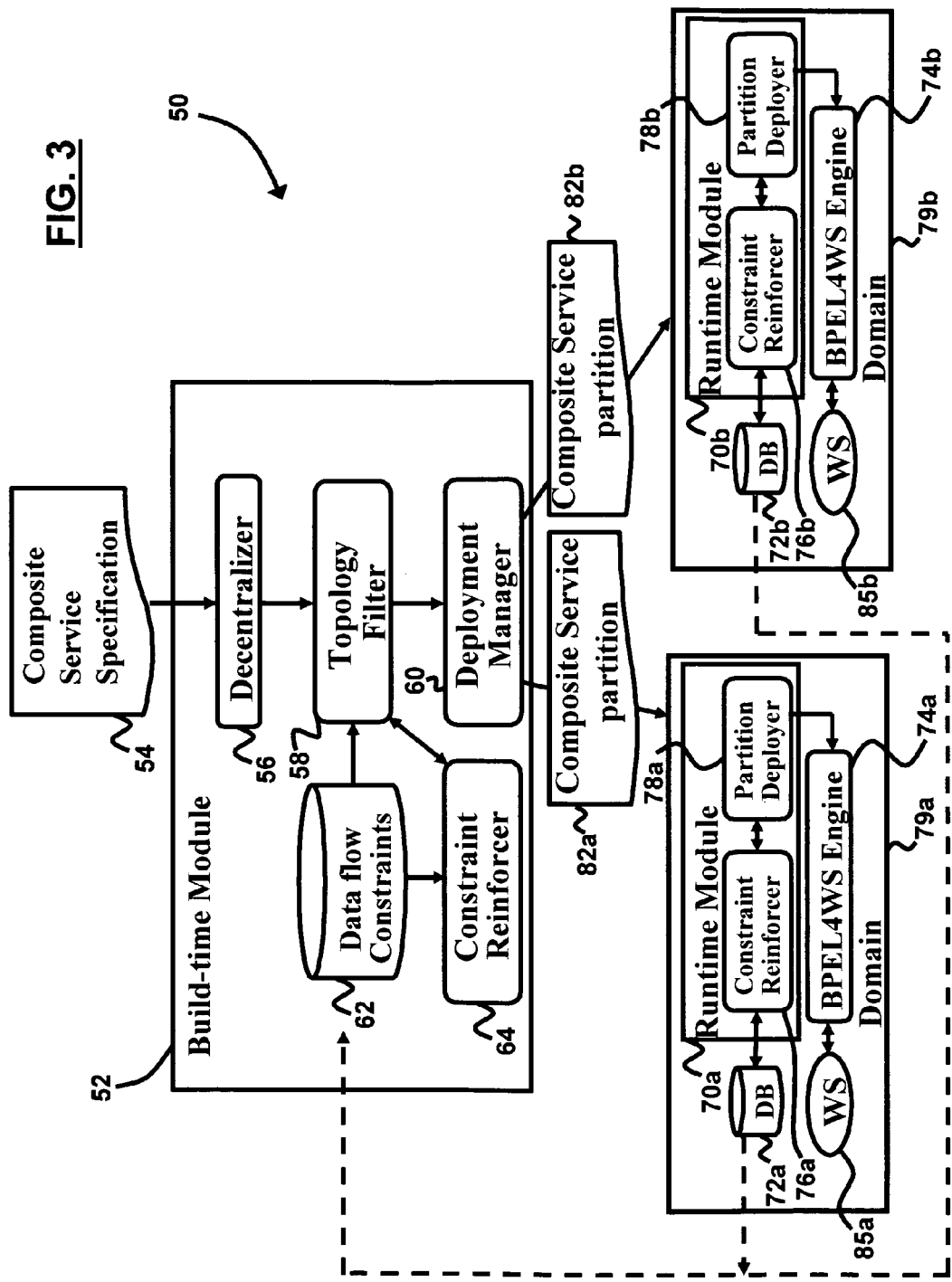
FIG. 3 is a schematic diagram of the system architecture according to an embodiment of the invention.

FIG. 3 shows a schematic diagram of a decentralized orchestration system 50 according to an embodiment of the invention that uses BPEL4WS as the language for specifying composite web services. The system 50 comprises a build time module 52 comprising computer logic circuitry (not shown) and more specifically comprising components 56, 58, 60, 62, and 64. The system 50 also includes multiple runtime modules 70a, 70b comprising computer logic circuitry (not shown) and more specifically comprising components 76a, 76b, 78a, and 78b and multiple constraint databases 72a, 72b located in the same domain as the corresponding runtime module.

The build time module 52 is used to create a decentralized composite service specification from an original input composite service specification 54. Specifically, the build time module 52 includes a decentralizer 56 adapted to receive the original input composite service specification 54 written, for example, in BPEL4WS; a topology filter 58 operatively connected to the decentralizer 56; and a set of data flow constraints downloaded from constraint databases 72a, 72b and stored in a data flow constraints database 62 that are fed into the topology filter 58 and the constraint reinforcer 64. The build time module 52 further includes a deployment manager 60 operatively connected to the topology filter 58.

The component web service domains (two sets of domains 79a, 79b are illustrated in FIG. 3), comprise a composite web service engine 74a, 74b, component web service 85a, 85b, a constraint database 72a, 72b, a runtime module 70a, 70b comprising a constraint reinforcer 76a, 76b, and a partition deployer 78a, 78b. The decentralizer 56 partitions the composite web service specification 54 using program analysis techniques; i.e., control flow analysis and data flow analysis. The partitions are full-fledged (i.e., functionally complete in and of themselves) composite web service specifications that execute at distributed locations and can be invoked remotely. The decentralizer 56 also generates the WSDL descriptors for each of these partitions 82a, 82b. The WSDL descriptors permit the partitions to be deployed and invoked like any standard web service.

Figure 4:
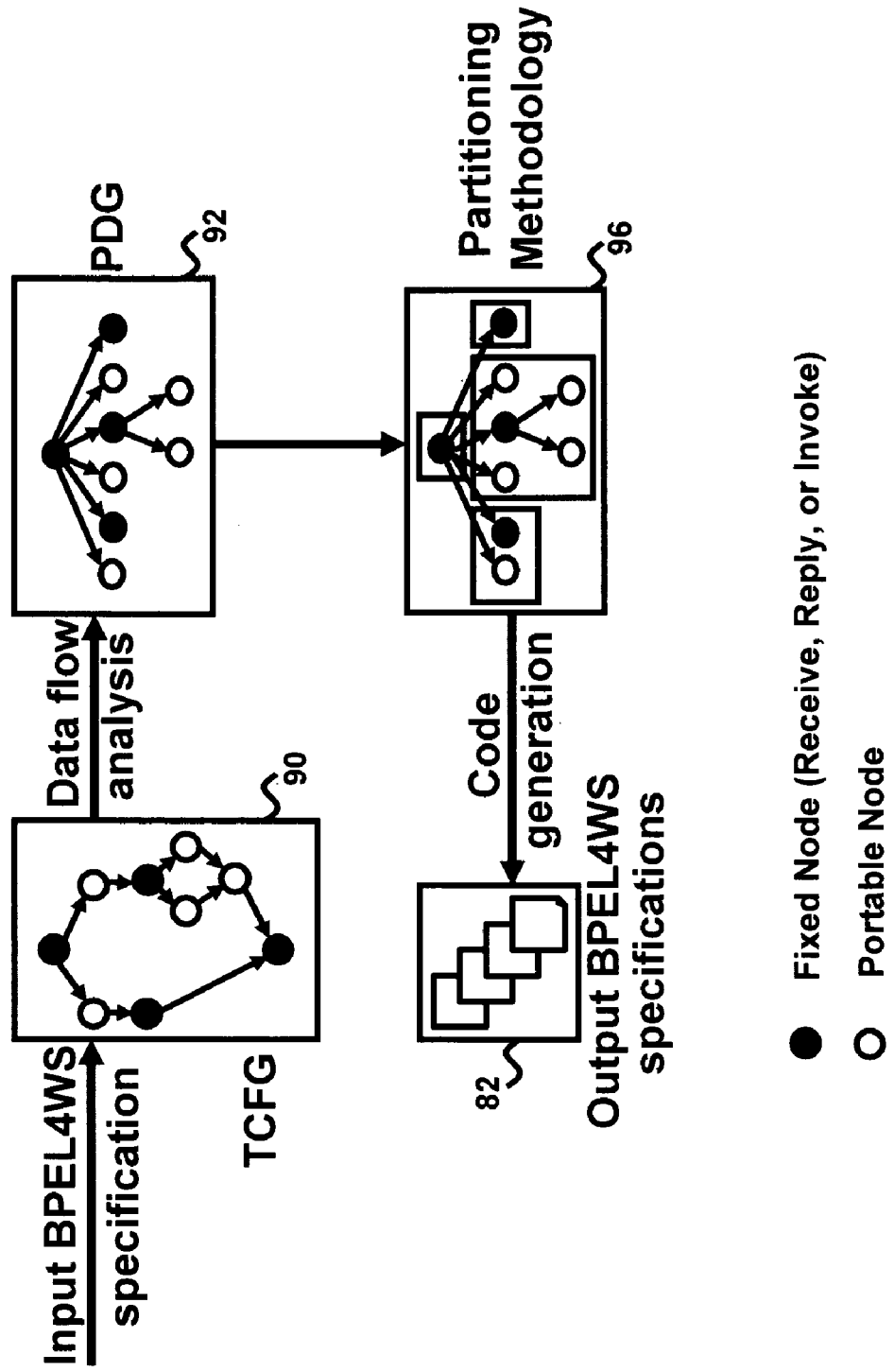
FIG. 4 is a schematic diagram of a decentralization process according to an embodiment of the invention.

FIG. 4 shows the decentralization process that occurs in the decentralizer 56 of FIG. 3, which includes the following steps: a Threaded Control Flow Graph (TCFG) 90 of the input BPEL4WS program is generated based on the input BPEL4WS specification 54 (shown in FIG. 3). The control flow nodes in the graph that represent BPEL4WS activities—invoke, receive, pick, and reply, are marked as fixed nodes and the nodes that represent the rest of the BPEL4WS activities are marked as portable nodes. The BPEL4WS activities—invoke, receive, pick, and reply, all represent activities that perform some input/output (I/O) operation and comprise either an incoming message or an outgoing message or both for the composite web service.

A Data Dependence Graph (DDG) and the Control Dependence Graph (CDG) are generated using data flow analysis. The DDG captures data dependences between the nodes of the TCFG 90 and the CDG captures the control dependences. The Program Dependence Graph (PDG) 92 is a supergraph of the DDG and the CDG and represents the combined data dependence and control dependences between the nodes of the CDG.

Starting with the leaf nodes of the CDG, nodes that are siblings in the PDG 92 are merged such that each partition has exactly one fixed node and zero or more portable nodes. The partitioning methodology 96 merges nodes subject to the condition that the reordering of nodes along data dependence edges should result in a reordered PDG 92 that is isomorphic with the original PDG. Thereafter, BPEL4WS code is generated for each of these partitions using the PDG 92 and the resulting composite service partitions in BPEL4WS 82 are output from the decentralizer 56. A decentralization methodology, which may be used by the decentralizer 56, is described in Nanda et al., "Decentralizing Execution of Composite Web Services," In Proceedings of OOPSLA'04 Conference on Object Oriented Programming Systems, Languages, and Applications, 2004, the complete disclosure of which, in its entirety, is herein incorporated by reference.

This output 82 (of FIG. 4) is then fed into the topology filter 58 (of FIG. 3). The topology filter 58 receives the data flow constraints from constraint databases 62 comprising constraints downloaded from constraint databases 72a, 72b of the component web services. The data flow constraints may be written in XML and are expressed as a 3-tuple of <source, destination, MessageType>. Both the source and the destination are expressed in terms of a domain name. MessageType is the message type that a particular port type expects as input or sends as output. Constraints fall under the "Allowed" and "NotAllowed" categories. "Allowed" constraints are those where either a source can send data to a given set of destinations or where a destination can accept data from the given set of sources. Whereas, "NotAllowed" constraints are those where either a source cannot send data to a given set of destinations or where a destination cannot receive data from given set of sources. The source and destinations can also be expressed in terms of domain name sets; e.g. *.co.jp for all the companies in Japan.

In the insurance agent example previously described in FIG. 2, the data flow constraints for the Hospital can be expressed as follows:

```
<Allowed>
    <Source>HospitalX.com</Source>
    <Destination>InsuranceCompanyY.com</Destination>
    <MessageType>MedicalRecordsOutput</MessageType>
</Allowed>
<NotAllowed>
    <Source>HospitalX.com</Source>
    <Destination>*</Destination>
    <MesssageType>MedicalRecordsOutput</MessageType>
<NotAllowed>
```

More specific constraints override (i.e., have higher precedence over) the conflicting less specific constraints. The "Allowed" and "NotAllowed" constraints can appear in any relative order in the constraints schema with the condition that more specific constraints appear first followed by less specific ones. This condition helps in making the topology filtering methodology more efficient. Using this condition, the topology filtering methodology can now exit as soon as it finds a matching "Allowed" or "NotAllowed" constraint. The topology filtering methodology does not need to go over the rest of the constraints in the constraints schema as they are more general and specific constraints always override a more general constraint. These constraints can also be specified using other specifications such as WS-Policy and WS-Trust as these specifications continue to evolve.

Again, with reference to FIG. 3, the constraint reinforcer 64 ensures that the data flow constraints are applied to any new message types that are generated as a result of data transformations being applied to a message type that was part of the original constraints. In the example described above, if the data transformations generate a new message type "ModifiedMedicalRecords" that includes the message type "MedicalRecordsOutput" and some other additional data, then a new set of constraints for this new message type "ModifiedMedicalRecords" is generated and passed on to the topology filter 58. This new set of constraints is very similar to the ones that already exist for the original message type ("MedicalRecordsOutput") except for the name of the message type. In this case, the constraint reinforcer 64 passes the following set of new constraints to the topology filter 58:

```
<Allowed>
    <Source>HospitalX.com</Source>
    <Destination>InsuranceCompanyY.com</Destination>
    <MessageType>ModifiedMedicalRecords</MessageType>
</Allowed>
<NotAllowed>
    <Source>HospitalX.com</Source>
    <Destination>*</Destination>
    <MesssageType>ModifiedMedicalRecords</MessageType>
<NotAllowed>
```

The constraint reinforcer 64 uses the Data Dependence Graph (DDG) to trace the transformation of the output data of a component web service or the input data to the component web service. For each partition, the constraint reinforcer 64 searches for all the output activities (in an embodiment of the invention using BPEL4WS, this corresponds to the invoke activity) in that partition. For each invoke, the constraint reinforcer 64 extracts the input message type. The constraint reinforcer 64 uses the Data Dependence Graph (DDG) to trace back to the origin of this input message type. Then, the constraint reinforcer 64 searches for all the constraints in the constraints database 62 that have this original message type as part of the tuple.

Figure 5:
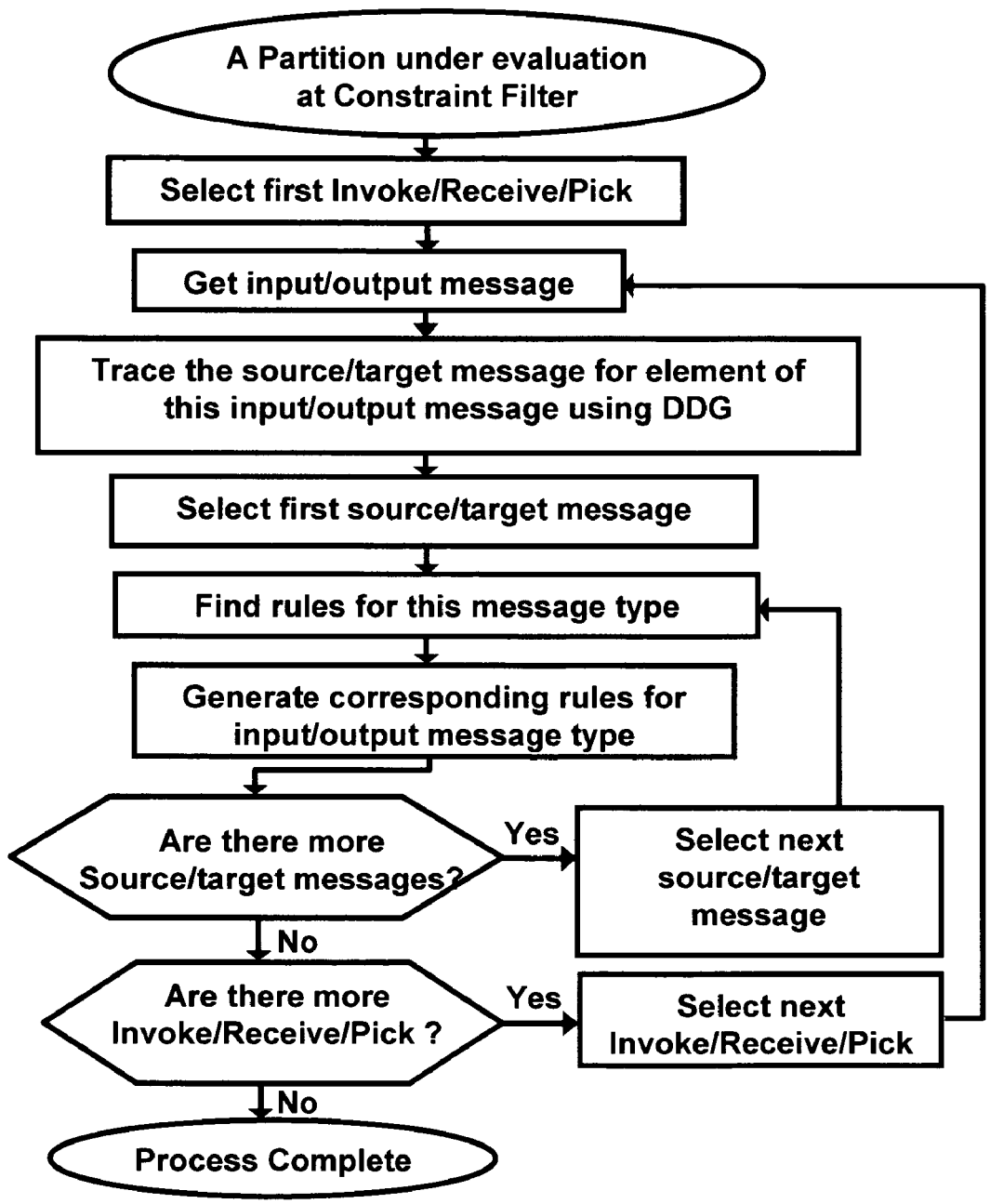
FIG. 5 is a flow diagram illustrating a constraint reinforcer methodology according to an embodiment of the invention.

For all such constraints, the constraint reinforcer 64 generates a new set of constraints essentially similar to the original ones but with the original message type replaced by the newly generated message type. Further, for each partition, the constraint reinforcer 64 searches for all the input activities (in an embodiment of the invention using BPEL4WS, this corresponds to the pick, invoke, and receive activities) in that partition. For each pick/invoke/receive, the constraint reinforcer 64 extracts the output message type. The constraint reinforcer 64 uses the Data Dependence Graph (DDG) to trace forward to the uses of this output message type. Then, the constraint reinforcer 64 searches for all the constraints in the constraints database 62 that have this original message type as part of the tuple. For all such constraints, the constraint reinforcer 64 generates a new set of constraints essentially similar to the original ones but with the original message type replaced by the newly generated message type. The methodology implemented by the constraint reinforcer 64 is shown in FIG. 5. The topology filter 58 gets all of the topologies generated by the decentralizer 56 as its input. For a given partition in a topology, the topology filter 58 first passes the partition to the constraint reinforcer 64 to get the additional set of constraints for that partition. It then parses the partition and searches for all the output activities (in an embodiment of the invention using BPEL4WS, this corresponds to the invoke activity). For each invoke activity in the partition, it extracts the fully qualified name of the corresponding destination port types and input message types. For each port type, the topology filter 58 then searches the component WSDLs and the newly created partition WSDLs. Once the topology filter 58 finds that port type in a WSDL, it extracts the corresponding domain name (to which that port type belongs) to determine the destination. The source for a particular partition is determined from the deployment information of the partition in question (the node where that partition will be deployed becomes the source). This deployment information is inferred from the WSDLs of the component web services. The message type is determined from the input message type for invoke.

The topology filter 58 then re-parses the partition and searches for all the input activities (in an embodiment of the invention using BPEL4WS, this corresponds to the pick, invoke, and receive activities). For each pick, invoke, or receive activity in the partition, it extracts the fully qualified name of the corresponding port type and output message type. For each port type, the topology filter 58 then searches the other partitions' composite web service specifications. Once the topology filter 58 finds that port type in a specification, it extracts the corresponding domain name (of the found composite web service) from the deployment information of the found specification to determine the source. The destination for a particular partition is determined from the deployment information of the partition in question (the node where that partition will be deployed becomes the destination). This deployment information is inferred from the WSDLs of the component web services. The message type is determined from the output message type for pick/invoke/receive.

Figure 6:
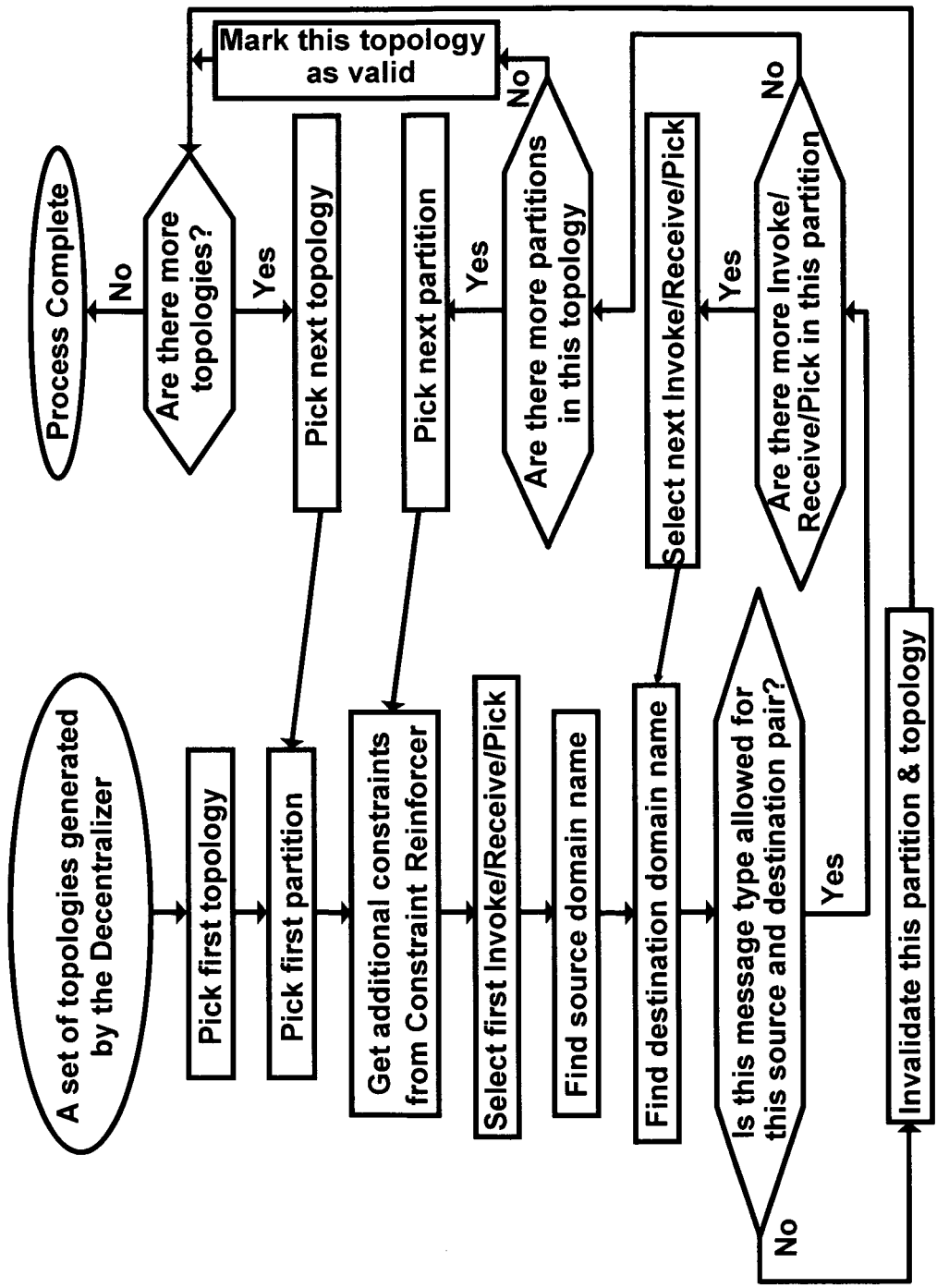
FIG. 6 is a flow diagram illustrating a topology filter methodology according to an embodiment of the invention.

In this manner, the topology filter 58 forms a list of such 3-tuples for each partition. For each such 3-tuple of <source, destination, MessageType> for a partition, the topology filter 58 checks the applicability of all constraints from the constraint database as well as new constraints created by the constraint reinforcer 64 (one by one) on this tuple. If an "Allowed" constraint matches this tuple, further checking for the tuple is stopped and the topology filter 58 moves to the next tuple in the 3-tuple list. If a "NotAllowed" constraint matches the tuple, further checking for the tuple is stopped and the current decentralized topology is discarded. If no constraint matches the tuple, the partition is deemed to be matching with an "Allowed" constraint. The topology filter 58 then repeats this process for the next 3-tuple of <source, destination, MessageType> (corresponding to a different invoke activity) for that partition. If the partition adheres to all the constraints (original constraints as well as the additional ones generated by the constraint reinforcer 64) for all such 3-tuples in the list, the topology filter 58 picks up the next partition and repeats the entire process. The methodology implemented by the topology filter 58 is shown in FIG. 6.

In the example previously described, for all the partitions that violate the data flow constraint (e.g. allow data to flow from hospital to anyone except insurance company), the topology filter 58 will not find a match in the first constraint (the "Allowed" constraint) but will find a match in the second constraint (the "NotAllowed" constraint) and stop. The topology filter 58 then invalidates that partition (and that topology as a consequence). If the partition adheres to the data flow constraint, for each pick/receive/invoke in the partition, the topology filter 58 will either find a match in the first "Allowed" constraint or it will not find any match (and thus use the default value—"Allowed") and stop. It then repeats the same process for all the partitions in that topology.

Again, with reference to FIG. 3, the deployment manager 60 gets a set of valid topologies for deployment from the topology filter 58. The deployment manager 60 selects one of these topologies (e.g. by applying some cost function to evaluate the best topology) for deployment and sends the partitions of that topology for deployment onto the corresponding component web service nodes. The partition deployer 78a, 78b is part of the runtime module of the system which is located inside the corresponding component web services domain 79a, 79b. The partition deployer 78a, 78b has two functions: (1) constraint reinforcing and verification; and (2) deployment. The partition deployer 78a, 78b verifies whether the partition submitted for deployment at this location satisfies all the data flow constraints specified by this location. Constraint reinforcing and verification in the runtime module is required because the partition is generated by an external entity and after deployment the partition executes within the domain 79a, 79b as a trusted piece of code and has full access to unencrypted output data of the component web service if encryption is being used.

The partition deployer 78a, 78b accepts the incoming composite service partition and passes it to the constraint reinforcer 76 to generate the additional set of constraints. In cases where encryption is being utilized through WS-Security, the constraint reinforcer 76a, 76b is utilized to add additional security policies to the existing security policies so that any confidential data that is flowing out of that node in the form of newly created message types is also encrypted. For the previous example, the existing security policies of hospital is enhanced so that newly generated message type "Modified-MedicalRecords" (that contains the original message type "MedicalRecordsOutput") is also encrypted according to the policies for the original message type "MedicalRecordsOutput". The partition deployer 78a, 78b then verifies that this partition adheres to all the data flow constraints using the same methodology as used by the topology filter 58. Once the partition passes constraint verification, it is then deployed on to the BPEL4WS engine 74a, 74b.

Figure 7:
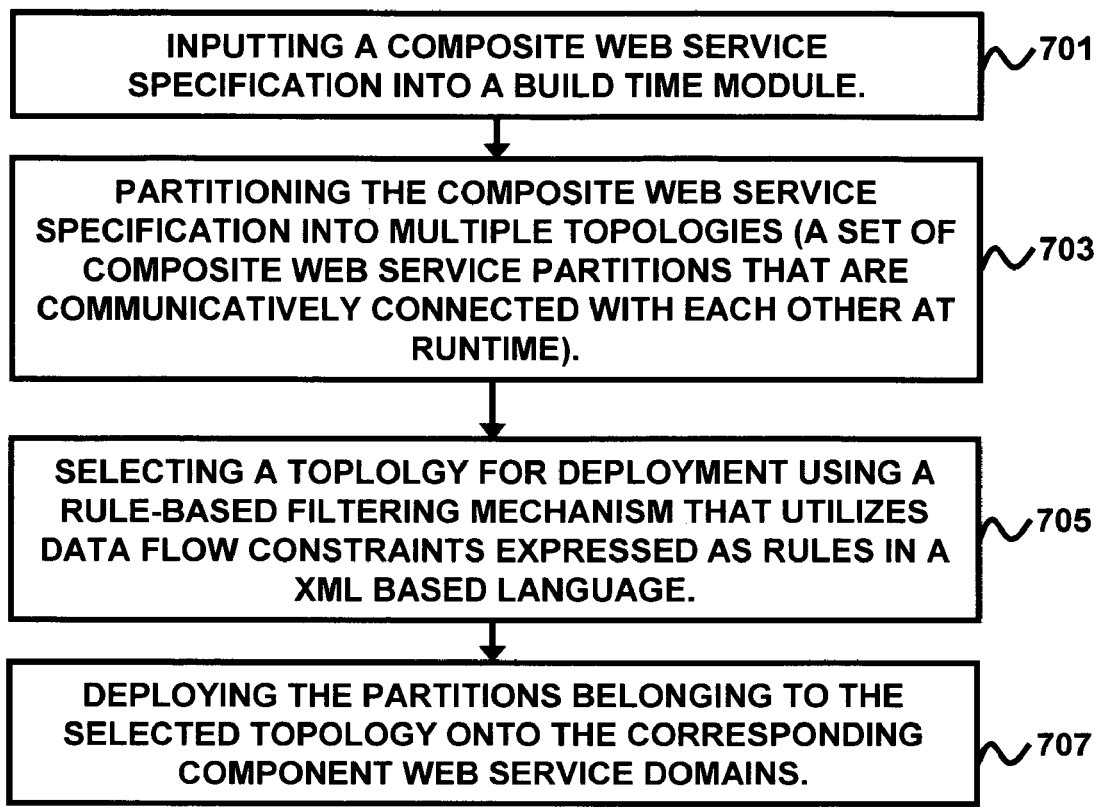
FIG. 7 is a flow diagram illustrating a preferred method according to an embodiment of the invention.

FIG. 7, with reference to FIGS. 2 through 6, illustrates a flow diagram of a method of orchestrating composite web services in a constrained data flow environment, wherein the method comprises inputting (701) a composite web service specification 54 into a build time module 52; partitioning (703) the composite web service specification 54 into multiple topologies, wherein each topology consists of a set of partitions 82a, 82b that are communicatively connected with each other at runtime, wherein each composite web service partition 82a, 82b comprises a functionally complete composite web service; selecting (705) a topology for deployment using a rule-based filtering mechanism 58; and deploying (707) composite web service partitions 82a, 82b within a specified component web service domain 79a, 79b.

The method further comprises generating a WSDL and BPEL4WS specification for each composite web service partition 82a, 82b. The method further comprises using an XML based language to express the data flow constraints as rules specified in terms of a 3-tuple group of a source of the data, a destination of the data, and a message type for communicating the data. The method also includes assuring that the data flow constraints are applied to any new message type generated as a result of data transformations being applied to a message type that is part of an original data flow constraint and sending the web service partitions 82a, 82b to multiple runtime modules 70a, 70b residing at the component web service domain 79a, 79b, respectively. Moreover, the method comprises generating an additional set of constraints based on the composite web service partitions 82a, 82b received in the runtime modules 70a, 70b and verifying that the composite web service partitions 82a, 82b adhere to the data flow constraints of a receiving component web service domain 79a, 79b.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

An embodiment of the invention provides a system 50 for orchestration of composite web services in constrained data flow environments. The embodiments of the invention overcome data flow constraints by moving the data transformations (code that modifies or utilizes the output data of a component web service or input data received from the client before it is fed as input to the next component web service 85a, 85b or sent back to the client) to be applied within a domain trusted by both the producer and the consumer of the data (which in most cases will be either the producer domain or the consumer domain of the data). The system 50 provided by an embodiment of the invention makes use of decentralized orchestration to compose web services under such restrictive environments. Decentralized orchestration is achieved by partitioning the composite web service specification 54 (written in a language such as BPEL4WS) into partitions that are complete web service specifications in themselves and communicate with each other using asynchronous messaging. The system 50 provided by an embodiment of the invention accomplishes this partitioning automatically using data and control flow analysis for this purpose.

Moreover, the system 50 provided by an embodiment of the invention generates a number of topologies in which the composite service partitions communicate with each other in various ways. Not all of the topologies adhere to the data flow constraints specified by different component web service domains 79a, 79b. These data flow constraints are represented in an XML based language as a 3-tuple-<source, destination, MessageType> and are downloaded from the constraint database 72a, 72b of component web service domain 79a, 79b. These constraints are then read and are used to validate all the partitions in a topology against these rules. Only the topologies, for which all the partitions adhere to the data flow constraints, are valid candidates for deployment. One of these topologies is chosen and the partitions are deployed to the nodes of component web services' domains. The runtime environment at different component nodes 70a, 70b verifies the partition for adherence to data flow constraints and deploys it onto the composite web service engine 74a, 74b in domain 79a, 79b respectively.

The system 50 provided by an embodiment of the invention orchestrates the composite web services requiring confidentiality of the data generated, and/or authenticity of the data consumed by its component web services. Traditional systems and methods of web services security and encryption when used with centralized orchestration generally fail to solve this problem in a generic manner. The system provided by an embodiment of the invention receives a centralized composite service specification 54 (written in a language like BPLE4WS), which is easier to develop and more intuitive, and decentralizes it through automatic code partitioning, thereby making it easier for the developer to compose and deploy such a composite service in a decentralized manner. The system 50 provided by an embodiment of the invention also helps in "on the fly" composition of web services where component web services are discovered dynamically through web service discovery mechanisms such as UDDI and pre-existing policies prohibit interaction between them.

The embodiments of the invention can be implemented as part of a larger system such as (but not limited to) an application server, a business process execution engine, web services runtime infrastructure, web service orchestration server, etc. In the system 50 described in FIG. 3, data flow constraints expressed in terms of source, destination, and message type are similar to confidentiality labels used in secure partitioning. Web services provide the added advantage of defining them as extensibility elements in the WSDL or to be downloaded from a constraints database 62 rather than annotating the source program with security policies.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the embodiments of the invention can be practiced with modification within the spirit and scope of the appended claims.

What is claimed is:

1. A system for orchestrating composite web services in a constrained data flow environment, said system comprising:
   an input device for receiving an input composite web service specification;
   a processor that processes instructions from a program storage device;
   a build time module comprising logic circuitry adapted to:
      receive a composite web service specification;
      partition said composite web service specification into multiple topologies, wherein each topology comprises a set of composite web service partitions that are communicatively connected with each other at runtime, and wherein each composite web service partition comprises a functionally complete composite web service; and
      select a topology for deployment;
   at least one runtime module comprising logic circuitry adapted to verify and deploy partitions of the selected topology within a corresponding component web service domain, and
   an output device that outputs at least one output of said set of composite web service partitions from said deployed partitions of said the selected topology within said corresponding component web service domain,
   wherein said build time module comprises a topology filter comprising a rule-based filtering mechanism adapted to select said topology that adheres to all data flow constraints provided by component web service domains, and
   wherein said runtime module comprises a runtime constraint reinforcer adapted to generate an additional set of constraints based on said composite web service partitions received in said runtime modules and data flow constraints of a corresponding component web service domain.

2. The system of claim 1, wherein said data flow constraints are expressed as rules specified in terms of a 3-tuple group of a source of said data, a destination of said data, and a message type and are represented by an eXtensible Markup Language (XML) representation.

3. The system of claim 1 wherein said build time module comprises a constraint reinforcer adapted to ensure that said data flow constraints are applied to any new message type generated as a result of data transformations being applied to a message type that is part of an original data flow constraint.

4. The system of claim 1, wherein said build time module comprises a deployment manager adapted to send said web service partitions to multiple runtime modules residing at said component web service domains.

5. The system of claim 1, wherein said runtime module comprises a partition deployer adapted to verify that said composite web service partitions adhere to said data flow constraints of a receiving component web service domain.

6. A computer-implemented method of orchestrating composite web services in a constrained data flow environment, said method comprising:
- inputting a composite web service specification into a build time module of a computer;
- partitioning said composite web service specification into multiple topologies using said computer, wherein each topology comprises a set of composite web service partitions that are communicatively connected with each other at runtime, and wherein each composite web service partition comprises a functionally complete composite web service;
- selecting a topology for deployment using a rule-based filtering mechanism using said computer, said selected topology adheres to all data flow constraints provided by component web service domains;
- deploying partitions of the selected topology within a corresponding component web service domain using said computer, and
- generating an additional set of constraints based on said composite web service partitions received in said runtime modules and the data flow constraints provided by a receiving component web service domain, using said computer.

7. The method of claim 6 wherein said data flow constraints are expressed as rules specified in terms of a 3-tuple group of a source of said data, a destination of said data, and a message type and are represented by an eXtensible Markup Language (XML) representation.

8. The method of claim 6 further comprising that said data flow constraints are applied to any new message type generated as a result of data transformations being applied to a message type that is part of an original data flow constraint.

9. The method of claim 6 further comprising sending said composite web service partitions to multiple runtime modules residing at said component web service domain.

10. The method of claim 6 further comprising verifying that said composite web service partitions adhere to said data flow constraints of a receiving component web service domain.

11. A program storage medium readable by computer, tangibly embodying a program of instructions executable by said computer to perform a method of orchestrating composite web services in a constrained data flow environment, said method comprising:
- inputting a composite web service specification into a build time module;
- partitioning said composite web service specification into multiple topologies, wherein each topology comprises a set of composite web service partitions that are communicatively connected with each other at runtime, and wherein each composite web service partition comprises a functionally complete composite web service;
- selecting a topology for deployment using a rule-based filtering mechanism; and
- deploying partitions of the selected topology within a corresponding component web service domain,
- wherein said rule-based filtering mechanism selects a topology that adheres to all data flow constraints provided by component web service domains, and
- wherein said method further comprises generating an additional set of constraints based on said composite web service partitions received in said runtime modules and the data flow constraints provided by a receiving component web service domain.

12. The program storage device of claim 11, wherein said data flow constraints are expressed as rules specified in terms of a 3-tuple group of a source of said data, a destination of said data, and a message type and are represented by an eXtensible Markup Language (XML) representation.

13. The program storage device of claim 11, wherein said method further comprises assuring that said data flow constraints are applied to any new message type generated as a result of data transformations being applied to a message type that is part of an original data flow constraint.

14. The program storage device of claim 11, wherein said method further comprises sending said composite web service partitions to multiple runtime modules residing at said component web service domain.

15. The program storage device of claim 11, wherein said method further comprises verifying that said composite web service partitions adhere to said data flow constraints of a receiving component web service domain.

16. A computer-implemented service for orchestrating composite web services in a constrained data flow environment, said service:
- inputting, using a computing device, a composite web service specification into a build time module;
- partitioning, using a computing device, said composite web service specification into multiple topologies, wherein each topology comprises a set of composite web service partitions that are communicatively connected with each other at runtime, and wherein each composite web service partition comprises a functionally complete composite web service;
- selecting, using a computing device, a topology for deployment using a rule-based filtering mechanism, wherein said selected topology adheres to all data flow constraints provided by component web service domains;
- deploying, using a computing device, partitions of the selected topology within a corresponding component web service domain;
- outputting data from each of said partitions of the selected topology within said corresponding component web service domain; and
- generating an additional set of constraints based on said composite web service partitions received in said runtime modules and the data flow constraints provided by a receiving component web service domain.

17. The service of claim 16, wherein said data flow constraints are expressed as rules specified in terms of a 3-tuple group of a source of said data, a destination of said data, and a message type and are represented by an eXtensible Markup Language (XML) representation.

18. The service of claim 16, further comprising ensuring that said data flow constraints are applied to any new message type generated as a result of data transformations being applied to a message type that is part of an original data flow constraint.

19. The service of claim 16, further comprising sending said composite web service partitions to multiple runtime modules residing at said component web service domain.

20. The service of claim 16, further comprising verifying that said composite web service partitions adhere to said data flow constraints of a receiving component web service domain.

21. A system for orchestrating composite web services in a constrained data flow environment, said system comprising:
- an input device for receiving an input composite web service specification;
- a processor that processes instructions from a program storage device;
- means for inputting a composite web service specification into a build time module;

means for partitioning said composite web service specification into multiple topologies, wherein each topology comprises a set of composite web service partitions that are communicatively connected with each other at runtime, and wherein each composite web service partition comprises a functionally complete composite web service;

means for selecting a topology for deployment using a rule-based filtering mechanism;

means for deploying partitions of the selected topology within a corresponding component web service domain, and an output device that outputs at least one output of said set of composite web service partitions from said deployed partitions of said the selected topology within said corresponding component web service domain, wherein said means for deploying partitions comprises means for constraint reinforcing that generates an additional set of constraints based on said composite web service partitions received in said runtime modules and data flow constraints of a corresponding component web service domain.

* * * * *

UNITED STATES PATENT AND TRADEMARK OFFICE
CERTIFICATE OF CORRECTION

PATENT NO. : 7,606,832 B2  Page 1 of 1
APPLICATION NO. : 10/987997
DATED : October 20, 2009
INVENTOR(S) : Chafle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Twelfth Day of October, 2010

David J. Kappos
*Director of the United States Patent and Trademark Office*